United States Patent
Van Doren et al.

(10) Patent No.: US 7,769,959 B2
(45) Date of Patent: Aug. 3, 2010

(54) SYSTEM AND METHOD TO FACILITATE ORDERING POINT MIGRATION TO MEMORY

(75) Inventors: Stephen R. Van Doren, Northborough, MA (US); Gregory Edward Tierney, Chelmsford, MA (US); Simon C. Steely, Jr., Hudson, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1426 days.

(21) Appl. No.: 10/760,599

(22) Filed: Jan. 20, 2004

(65) Prior Publication Data

US 2005/0160233 A1 Jul. 21, 2005

(51) Int. Cl.
*G06F 13/00* (2006.01)
(52) U.S. Cl. ............... 711/143; 711/3; 711/119; 711/124; 711/141; 711/146
(58) Field of Classification Search ............... None
See application file for complete search history.

(56) References Cited

U.S. PATENT DOCUMENTS

| | | | |
|---|---|---|---|
| 5,301,298 A | 4/1994 | Kagan | |
| 5,489,791 A | 2/1996 | Arima | |
| 5,535,116 A | 7/1996 | Gupta | |
| 5,706,463 A | 1/1998 | Ebrahim | |
| 5,802,577 A | 9/1998 | Bhat et al. | |
| 5,829,040 A | 10/1998 | Son | |
| 5,875,467 A | 2/1999 | Merchant | |
| 5,875,472 A | 2/1999 | Bauman et al. | |
| 5,893,922 A | 4/1999 | Baylor | |
| 5,945,710 A | 8/1999 | Oda | |
| 5,958,019 A | 9/1999 | Hagersten et al. | |
| 5,987,571 A | 11/1999 | Shibata | |
| 6,049,851 A | 4/2000 | Bryg | |
| 6,055,605 A | 4/2000 | Sharma et al. | |
| 6,085,263 A | 7/2000 | Sharma et al. | |
| 6,108,737 A | 8/2000 | Sharma et al. | |
| 6,128,677 A | 10/2000 | Miller | |
| 6,138,218 A * | 10/2000 | Arimilli et al. | 711/146 |
| 6,245,603 B1 | 6/2001 | Shinohara | |
| 6,272,602 B1 | 8/2001 | Singhal | |
| 6,345,342 B1 | 2/2002 | Arimilli et al. | |

(Continued)

FOREIGN PATENT DOCUMENTS

JP 10-189951 7/1998

(Continued)

OTHER PUBLICATIONS

Bandwidth Adaptive Snooping; Martin et al.; Proceedings of the Eighth International Symposium on High-performance Computer Architecture (HPCA'02); © 2002 IEEE.*

(Continued)

*Primary Examiner*—Mardochee Chery (57) ABSTRACT

A system may comprise a first node that includes an ordering point for data, the first node being operative to employ a write-back transaction associated with writing the data back to memory. The first node broadcasts a write-back message to at least one other node in the system in response to an acknowledgement provided by the memory indicating that the ordering point for the data has migrated from the first node to the memory.

25 Claims, 5 Drawing Sheets

U.S. PATENT DOCUMENTS

| | | | |
|---|---|---|---|
| 6,351,784 | B1 | 2/2002 | Neal |
| 6,457,100 | B1 | 9/2002 | Ignatowski et al. |
| 6,467,012 | B1 | 10/2002 | Alvarez |
| 6,484,240 | B1 | 11/2002 | Cypher |
| 6,490,661 | B1 | 12/2002 | Keller et al. |
| 6,529,990 | B1 | 3/2003 | Kruse |
| 6,615,319 | B2 | 9/2003 | Khare |
| 6,631,401 | B1 | 10/2003 | Keller et al. |
| 6,631,448 | B2 | 10/2003 | Weber |
| 6,633,960 | B1 | 10/2003 | Kessler |
| 6,654,858 | B1 | 11/2003 | Asher |
| 6,696,729 | B2 | 2/2004 | Adachi |
| 6,711,653 | B1 | 3/2004 | Quach |
| 6,745,272 | B2 | 6/2004 | Owen |
| 6,751,721 | B1 | 6/2004 | Webb, Jr. et al. |
| 6,877,056 | B2 | 4/2005 | Cypher |
| 6,883,070 | B2 | 4/2005 | Martin |
| 6,922,756 | B2 | 7/2005 | Hum |
| 6,931,496 | B2 | 8/2005 | Chen |
| 6,993,631 | B2 | 1/2006 | Rowlands |
| 7,032,079 | B1 | 4/2006 | Bauman |
| 7,143,245 | B2 | 11/2006 | Tierney |
| 7,149,852 | B2 | 12/2006 | Van Doren |
| 7,171,521 | B2 | 1/2007 | Rowlands |
| 7,176,097 | B2 | 2/2007 | Hiraizumi |
| 7,222,220 | B2 | 5/2007 | Cypher |
| 7,395,374 | B2 | 7/2008 | Tierney |
| 2001/0034815 | A1 | 10/2001 | Dungan et al. |
| 2002/0009095 | A1 | 1/2002 | Van Doren et al. |
| 2002/0073071 | A1 | 6/2002 | Pong et al. |
| 2002/0129211 | A1 | 9/2002 | Arimilli |
| 2003/0018739 | A1 | 1/2003 | Cypher et al. |
| 2003/0140200 | A1 | 7/2003 | Jamil et al. |
| 2003/0145136 | A1 | 7/2003 | Tierney et al. |
| 2003/0195939 | A1 | 10/2003 | Edirisooriya et al. |
| 2003/0200397 | A1 | 10/2003 | McAllister et al. |
| 2003/0217236 | A1* | 11/2003 | Rowlands ............. 711/145 |
| 2004/0002992 | A1* | 1/2004 | Cypher et al. ......... 707/102 |
| 2004/0068624 | A1 | 4/2004 | Van Doren |
| 2004/0123047 | A1 | 6/2004 | Hum |
| 2004/0123052 | A1 | 6/2004 | Beers |
| 2004/0181636 | A1 | 9/2004 | Martin |
| 2005/0013294 | A1 | 1/2005 | Cypher |
| 2005/0053057 | A1 | 3/2005 | Deneroff |
| 2005/0060502 | A1 | 3/2005 | Tan |
| 2005/0160238 | A1 | 7/2005 | Steely, Jr. |
| 2005/0251626 | A1* | 11/2005 | Glasco ................ 711/133 |
| 2005/0251631 | A1* | 11/2005 | Rowlands et al. ...... 711/145 |

FOREIGN PATENT DOCUMENTS

| | | |
|---|---|---|
| JP | 2000-232075 | 8/2000 |
| JP | 2003-017578 | 1/2003 |

OTHER PUBLICATIONS

Rajeev, Joshi, et al., "Checking Cache-Coherence Protocols with TLA+", Kluwer Academic Publishers, 2003, pp. 1-8.
Martin, Milo M.K., et al., "Token Coherence: Decoupling Performance and Correctness", ISCA-30, pp. 1-12, Jun. 9-11, 2003.
Acacio, Manuel E., et al., "Owner Prediction for Accelerating Cache-to-Cache Transfer Misses in a cc-NUMA Architecture", IEEE 2002.
Gharachorloo, Kourosh, et al., "Architecture and Design of AlphaServer GS320", Western Research Laboratory, (Date Unknown).
Gharachorloo, Kourosh, et al., "Memory Cosistency and Event Ordering in Scalable Shared Memory Multiprocessors", Computer Systems Laboratory, pp. 1-14, (Date Unknown).
Martin, Milo M.K., et al., "Token Coherence: Decoupling Performance and Correctness", ISCH-30, pp. 1-12, Jun. 9-11, 2003.
Rajeev, Joshi et al., "Checking Cache-Coherence Protocols With TLA+", Kluwer Adacemic Publishers, 2003, pp. 1-8.
Handy, "The Cache Memory Book", 1998, Academic Press second edition, pp. 144-155.
Chen et al., "Write Caching in Distributed Filed Systems", Distributed Computing Systems, 1995., Proceedings of the 15th Int'l Con., May 30-Jun. 2, 1995, pp. 457-466.
Archibald et al., "Cache Coherence Portocols: Evaluation Using A Mulitprocessor Simulation Model", Nov. 1986, ACM Transactions on Computer Systems, pp. 273-298.
Gharachorloo, Kourosh et al., "Architecture and Design of AlphaServer GS320", Western Research Laboratory, (Date Unknown).
Gharachorloo, Kourosh et al., "Memory Consistency and Event Ordering in Scalable Shared-Memory Multiprocessors", Computer Systems Laboratory, pp. 1-14(Date Unknown).
Martin et al., "Bandwidth Adaptive Snooping", Proceedings of the Eighth International Symposium on High-Performance Computer Architecture (HPCA'02), 2002 IEEE.
Acacio, Manuel et al., "Owner Prediction for Accelerating Cache-to-Cache Transfer Misses in A cc-NUMA Architecture", IEEE 2002.
Notice of Allowance dated Jun. 8, 2006 for U.S. Appl. No. 10/761,044 in the United States.
Final Office Action dated Mar. 21, 2007 for U.S. Appl. No. 10/760,599 in the United States.
Non-Final Office Action dated Oct. 6, 2006 for U.S. Appl. No. 10/760,599 in the United States.
Non-Final Office Action dated Apr. 19, 2006 for U.S. Appl. No. 10/760,599 in the United States.
Final Office Action dated Apr. 18, 2007 for U.S. Appl. No. 10/760,640 in the United States.
Non-Final Office Action dated Oct. 10, 2006 for U.S. Appl. No. 10/760,640 in the United States.
Non-Final Office Action dated Apr. 19, 2006 for U.S. Appl. No. 10/760,640 in the United States.
Final Office Action dated Dec. 4, 2006 for U.S. Appl. No. 10/760,813 in the United States.
Non-Final Office Action dated Jun. 29, 2006 for U.S. Appl. No. 10/760,813 in the United States.
Non-Final Office Action dated May 14, 2009 for U.S. Appl. No. 10/761,048 in the United States.
Notice of Allowance dated Jun. 2, 2009 for U.S. Appl. No. 10/761,047 in the United States.
Final Office Action dated Feb. 4, 2009 for U.S. Appl. No. 10/761,047 in the United States.
Non-Final Office Action dated Aug. 20, 2008 for U.S. Appl. No. 10/761,047 in the United States.
Non-Final Office Action dated Mar. 6, 2008 for U.S. Appl. No. 10/761,047 in the United States.
Non-Final Office Action dated Sep. 20, 2007 for U.S. Appl. No. 10/761,047 in the United States.
Final Office Action dated Jun. 14, 2007 for U.S. Appl. No. 10/761,047 in the United States.
Non-Final Office Action dated Dec. 18, 2006 for U.S. Appl. No. 10/761,047 in the United States.
Non-Final Office Action dated Jun. 15, 2006 for U.S. Appl. No. 10/761,047 in the United States.
Scheurich et al., "The Design of a Lockup-free Cache for High-Performance Multiprocessors", Nov. 14-18, 1988 Supercomputing '88 (vol. 1) Proceedings pp. 352-359.
Laudon et al., "The SGI Orgin: A ccNUMA Highly Scalable Server", 1997 International Conference on Computer Architecture, pp. 241-251.
Non-Final Office Action dated Sep. 17, 2008 for U.S. Appl. No. 10/761,048 in the United States.
Final Office Action dated Mar. 13, 2007 for U.S. Appl. No. 10/760,652 in the United States.
Non-Final Office Action dated Jul. 25, 2006 for U.S. Appl. No. 10/760,652 in the United States.
Notice of Allowance dated Feb. 28, 2008 for U.S. Appl. No. 10/760,651 in the United States.
Non-Final Office Action dated Sep. 7, 2007 for U.S. Appl. No. 10/760,651 in the United States.
Non-Final Office Action dated Mar. 28, 2007 for U.S. Appl. No. 10/760,651 in the United States.

Non-Final Office Action dated Oct. 18, 2006 for U.S. Appl. No. 10/760,651 in the United States.
Non-Final Office Action dated May 19, 2006 for U.S. Appl. No. 10/760,651 in the United States.
Non-Final Office Action dated Dec. 19, 2005 for U.S. Appl. No. 10/760,651 in the United States.
Notice of Allowance dated Jun. 29, 2006 for U.S. Appl. No. 10/761,034 in the United States.
Final Office Acton dated Apr. 20, 2007 for U.S. Appl. No. 10/760,659 in the United States.
Non-Final Office Acton dated Nov. 17, 2006 for U.S. Appl. No. 10/760,659 in the United States.
Non-Final Office Acton dated May 23, 2006 for U.S. Appl. No. 10/760,659 in the United States.
Final Office Acton dated Mar. 29, 2007 for U.S. Appl. No. 10/761,073 in the United States.
Non-Final Office Acton dated Oct. 6, 2006 for U.S. Appl. No. 10/761,073 in the United States.
Notice of Allowance dated Sep. 27, 2006 for U.S. Appl. No. 10/760,463 in the United States.
Non-Final Office Action dated Mar. 31, 2006 for U.S. Appl. No. 10/760,463 in the United States.
Final Office Action dated Nov. 4, 2005 for U.S. Appl. No. 10/760,463 in the United States.
Non-Final Office Action dated Feb. 25, 2005 for U.S. Appl. No. 10/760,463 in the United States.
Non-Final Office Action dated Sep. 22, 2004 for U.S. Appl. No. 10/760,463 in the United States.
Examiner's Answer dated Jan. 31, 2008 for U.S. Appl. No. 10/760,599 in the United States.
Examiner's Answer dated Aug. 22, 2008 for U.S. Appl. No. 10/760,640 in the United States.
Examiner's Answer dated Jun. 17, 2008 for U.S. Appl. No. 10/760,813 in the United States.
Examiner's Answer dated Jun. 10, 2008 for U.S. Appl. No. 10/760,652 in the United states.
Examiner's Answer dated Feb. 8, 2008 for U.S. Appl. No. 10/760,659 in the United States.
Examiner's Answer dated Mar. 13, 2008 for U.S. Appl. No. 10/761,073 in the United States.
Examiner's Interview Summery dated Jan. 28, 2008 for U.S. Appl. No. 10/760,651 in the United States.

* cited by examiner

SYSTEM AND METHOD TO FACILITATE ORDERING POINT MIGRATION TO MEMORY

RELATED APPLICATIONS

This application is related to the following commonly assigned co-pending patent applications entitled: "CACHE COHERENCY PROTOCOL WITH ORDERING POINTS," U.S. patent application Ser. No. 10/760,640; "SYSTEM AND METHOD FOR RESOLVING TRANSACTIONS IN A CACHE COHERENCY PROTOCOL," U.S. patent application Ser. No. 10/760,813; "SYSTEM AND METHOD TO FACILITATE ORDERING POINT MIGRATION," U.S. patent application Ser. No. 10/761,048; "SYSTEM AND METHOD FOR CREATING ORDERING POINTS," U.S. patent application Ser. No. 10/760,652; "SYSTEM AND METHOD FOR CONFLICT RESPONSES IN A CACHE COHERENCY PROTOCOL WITH ORDERING POINT MIGRATION," U.S. patent application Ser. No. 10/760,651, now U.S. Pat. No. 7,395,374; "SYSTEM AND METHOD FOR READ MIGRATORY OPTIMIZATION IN A CACHE COHERENCY PROTOCOL," U.S. patent application Ser. No. 10/761,044, now U.S. Pat. No. 7,143.245; "SYSTEM AND METHOD FOR BLOCKING DATA RESPONSES," U.S. patent application Ser. No. 10/761,034, now U.S. Pat. No. 7,149,852; "SYSTEM AND METHOD FOR NON-MIGRATORY REQUESTS IN A CACHE COHERENCY PROTOCOL," U.S. patent application Ser. No. 10/760,659; "SYSTEM AND METHOD FOR CONFLICT RESPONSES IN A CACHE COHERENCY PROTOCOL WITH ORDERING POINT MIGRATION," U.S. patent application Ser. No. 10/761,073; "SYSTEM AND METHOD FOR CONFLICT RESPONSES IN A CACHE COHERENCY PROTOCOL," U.S. patent application Ser. No. 10/761,047, now U.S. Pat. No. 7,620,696; "SYSTEM AND METHOD FOR RESPONSES BETWEEN DIFFERENT CACHE COHERENCY PROTOCOLS," U.S. patent application Ser. No. 10/760,436, now U.S. Pat. No. 7,177,987, all of which are filed contemporaneously herewith and are incorporated herein by reference.

BACKGROUND

Multiprocessor systems employ two or more computer processors that can communicate with each other, such as over a bus or a general interconnect network. In such systems, each processor may have its own memory cache (or cache store) that is separate from the main system memory that the individual processors can access. Cache memory connected to each processor of the computer system can often enable fast access to data. Caches are useful because they tend to reduce latency associated with accessing data on cache hits, and they work to reduce the number of requests to system memory. In particular, a write-back cache enables a processor to write changes to data in the cache without simultaneously updating the contents of memory. Modified data can be written back to memory at a later time.

Coherency protocols have been developed to ensure that whenever a processor reads a memory location, the processor receives the correct or true data. Additionally, coherency protocols help ensure that the system state remains deterministic by providing rules to enable only one processor to modify any part of the data at any one time. If proper coherency protocols are not implemented, however, inconsistent copies of data can be generated.

There are two main types of cache coherency protocols, namely, a directory-based coherency protocol and a broadcast-based coherency protocol. A directory-based coherency protocol associates tags with each memory line. The tags can contain state information that indicates the ownership or usage of the memory line. The state information provides a means to track how a memory line is shared. Examples of the usage information can be whether the memory line is cached exclusively in a particular processor's cache, whether the memory line is shared by a number of processors, or whether the memory line is currently cached by any processor.

A broadcast-based coherency protocol employs no tags. Instead, in a broadcast-based coherency protocol, each of the caches monitors (or snoops) requests to the system. The other caches respond by indicating whether a copy of the requested data is stored in the respective caches. Thus, correct ownership and usage of the data are determined by the collective responses to the snoops.

SUMMARY

One embodiment of the present invention may comprise a system that includes a first node that includes an ordering point for data. The first node is operative to employ a write-back transaction associated with writing the data back to memory. The first node broadcasts a write-back message to at least one other node in the system in response to an acknowledgement provided by the memory indicating that the ordering point for the data has migrated from the first node to the memory.

Another embodiment of the present invention may comprise computer system that includes a first processor that provides a write-back request to transfer an ordering point for desired data from associated cache of the first processor to memory. The memory provides an acknowledgement back to the first processor in response to the write-back request. The first processor provides a source broadcast write-back request to the system in response to the acknowledgement provided by the memory. At least one other processor in the system provides an acknowledgement response to the first processor in response to the source broadcast write-back request provided by the first processor.

Yet another embodiment of the present invention may comprise a method that includes providing a write-back request from a first processor node to transfer an ordering point associated with data to memory. Receipt of the write back request at the memory is acknowledged. A source broadcast message is issued from the first processor node to other nodes in response to acknowledging receipt of the write back request at the memory.

DETAILED DESCRIPTION

This disclosure relates generally to a coherency protocol that facilitates migration of an ordering (or serialization) point to memory. The coherency protocol, for example, facilitates migrating an ordering point from a processor's cache to memory in a system employing a broadcast-based protocol. Coherency of the data that is being written to memory can be ensured, for example, by causing subsequent broadcast requests for the data to retry the request. The retry can be implemented, for example, using a forward progress protocol or other forward progress techniques to ensure the request is completed, such as after the memory update has been completed in the system.

Figure 1:
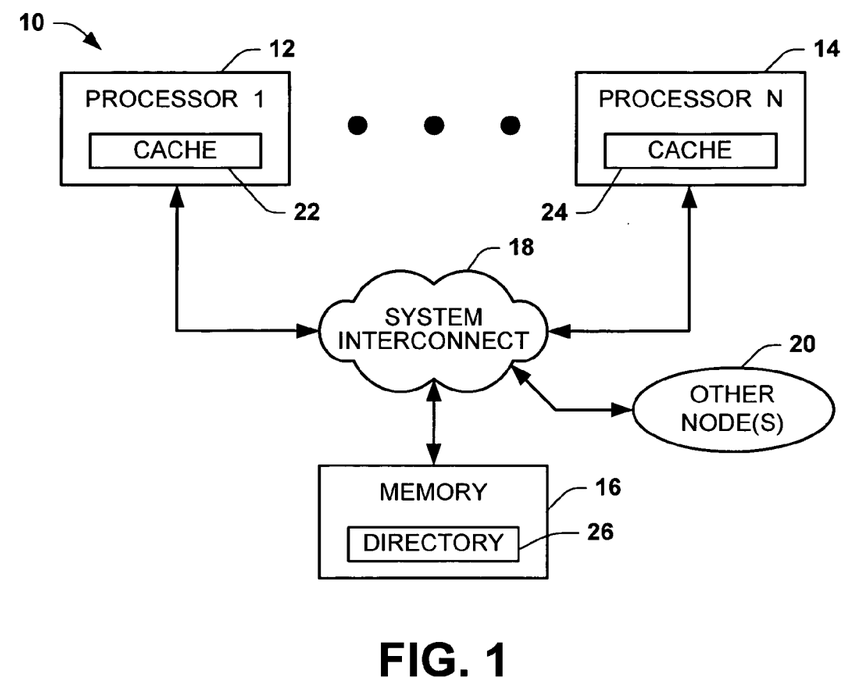
FIG. 1 depicts an example of a multiprocessor system.

FIG. 1 depicts an example of a system 10 that facilitates migration of a cache ordering point for data to memory. As used herein, an ordering point defines a serialization of requests to the same memory line (or memory block) that is understood and followed by the system 10 (e.g., an ordering point can respond to requests). A transaction for transferring data from a processor's cache to update memory with the data is referred to as a "write-back" or "victim."

The system 10 illustrates a multi-processor environment that includes a plurality of processors 12 and 14 (indicated at PROCESSOR 1 through PROCESSOR N, where N is a positive integer (N>1)). The system 10 also includes memory 16, which can be implemented in a variety of different physical embodiments in which one or more nodes are associated with the system and accessible by the processors 12, 14 and other nodes 20. In some cases, for example, the memory 16 may be a single node connected to the processors by means of a network (or interconnect) external to the processor chip. In other cases, the memory can consist of multiple nodes connected by an external network. In still another case, some of the network components may reside on the processor chip itself, such that multiple memory nodes may be attached to a processor-memory network by attaching to the processor chip.

The processors 12, 14 and memory 16 define nodes in the system 10 that can communicate with each other via a system interconnect 18. For example, the system interconnect 18 can be implemented as a switch fabric or a hierarchical switch. Also associated with the system 10 can be one or more other nodes, indicated schematically at 20. The other nodes 20 can correspond to one or more additional processors or other multi-processor systems (e.g., one or more symmetric multi-processor (SMP) nodes) connected to the system interconnect 18, such as through an appropriate interconnect interface (not shown).

Each of the processors 12 and 14 includes at least one corresponding cache 22 and 24. For purposes of brevity, each of the respective caches 22 and 24 are depicted as unitary memory structures, although they may include a plurality of memory devices or different cache levels. Each of the caches 22 and 24 includes a plurality of cache lines. Each cache line has an associated address that identifies corresponding data stored in the line. The system 10 employs the caches 22 and 24 and the memory 16 to store blocks of data, referred to as "memory blocks." A memory block can occupy part of a memory line, an entire memory line or span across multiple lines. For purposes of simplicity of explanation, however, this description assumes that a "memory block" occupies a single "memory line" in memory or a "cache line" in a cache.

Each cache line can also include information identifying the state of the data stored in the respective cache. A given memory block can be stored in a cache line of one or more of the caches 22 and 24 as well as in a memory line of the memory 16, depending on the state of the line. Whether a cache line contains a coherent copy of the data also depends on the state of the cache line. Certain states employed by the coherency protocol can define a given cache line as a cache ordering point for the system 10. A selected subset of these states further requires that the data be written back to the memory 16 upon its displacement, since the data may be more up-to-date than memory.

The system 10 implements a cache coherency protocol to manage the sharing of memory blocks so as to ensure coherence of data. The coherency protocol establishes rules for transitioning between states, such as if data is read from or written to memory 16 or one of the caches 22 and 24. For example, the system 10 can implement a broadcast-based protocol. A broadcast-based protocol, such as a source-broadcast-based protocol, provides that the source node broadcasts snoops or requests directly to all other nodes in the system 10. Broadcast snoops transmitted by the source node can include read requests, write requests and memory update commands. Alternatively, the system 10 can employ a hybrid protocol employing both a broadcast-based protocol and a forward progress protocol, such as a directory-based protocol.

As used herein, a node that issues a request, such as a victim, read or write request, defines a source node or requester. Other nodes within the system 10 are potential targets of the request. Additionally, each memory block in the system 10 can be assigned a "home node" that maintains necessary global information and a data value for that memory block. For example, in a directory-based protocol, the memory 16 can operate as the home node and include a directory 26. The memory 16 employs the directory 26 to ascertain where in the system 10 a coherent copy of the requested data should be located for each memory block. While a single memory 16 is depicted in FIG. 1, as mentioned above, multiple memory structures could be utilized, each maintaining global information for different groups of memory blocks.

A set of cache states that can be implemented by the system 10 for a respective cache line is depicted below in Table 1. Since, in this example, there are seven possible states, the state information can be encoded by a three-bit data word.

TABLE 1

| STATE | DESCRIPTION |
| --- | --- |
| I | Invalid - The cache line does not exist. |
| S | Shared - The cache line is valid and unmodified by caching processor. Other processors may have valid copies, and the caching processor cannot respond to snoops by returning data. |
| E | Exclusive - The cache line is valid and unmodified by caching processor. The caching processor has the only cached copy in the system and may respond to snoops by returning data. |
| F | First (among equals) - The cache line is valid and unmodified by caching processor. Other processors may have valid copies, and caching processor may respond to snoops by returning data. |
| D | Dirty - The cache line is valid and more up to date than memory. The cache line has not been modified by the caching processor, and the caching processor has the only cached copy in the system. The caching processor must respond to snoops by returning data and must write data back to memory upon displacement. The dirty state permits a modified block to be transferred between caches without updating memory. |
| M | Modified - The cache line is valid and has been modified by the caching processor. The caching processor has the only cached copy in the system, and the caching processor must respond to |

TABLE 1-continued

| STATE | DESCRIPTION |
|---|---|
| | snoops by returning data and must write data back to memory upon displacement. |
| O | Owned - The cache line is valid and more up to date than memory. The caching processor may have modified the cache line. Other processor may have valid copies, and the caching processor must respond to snoops by returning data and must write data back to memory upon displacement. |

As mentioned above, the state of a cache line can be utilized to define a cache ordering point in the system 10. In particular, for a protocol implementing the states set forth in Table 1, a cache line having one of the states M, O, E, F or D can serve as an ordering point for the data contained in that cache line. In particular, a cache line having any one of the states M, O and D must implement a write-back to memory upon displacement of the associated data. As a result of implementing the write-back, a cache ordering point for a given cache line will migrate from the cache of an associated processor to memory 16 so that the memory contains a coherent copy of the data.

The protocol implemented in the system 10 also enables movement of the ordering point from cache to memory while the broadcast-based protocol continues to run. In the event that another request for the data occurs concurrently with the write back transaction, the protocol helps maintain coherency of the data being written to memory by causing the new requester to reissue the request using the forward progress protocol or, alternatively, the request can be retried employing the broadcast-based protocol. The processor implementing the write-back provides a source-broadcast victim message to all other nodes in the system after the data has been written to the memory 16. The write-back transaction is deemed complete after the processor implementing the write-back has received an acknowledgement from each of the other nodes in the system 10. Once the write-back has completed, the system can process requests for the data using the broadcast-based protocol.

By way of example, assume that the processor 12 (a source node or requester) desires to displace an ownership copy of data associated with a particular memory address. Further, assume that the data being displaced is stored in cache 22 in one of the M, O or D-states. Therefore, the data has an associated state in the protocol that defines the associated cache line as a cache ordering point in the system 10 and may be more up-to-date than memory. As a result, the protocol implemented by the system provides that the processor 12 must perform a write-back or victim transaction to update the memory 16. The processor 12, operating as the source node, begins the write-back transaction by transmitting a write-back (or victim) request to the memory 16 via the system interconnect 18, which request includes a copy of the data. The source processor 12 also transitions to the I-state in connection with providing the write-back request. The memory 16 provides an acknowledgement signal back to the source processor 12 in response to receiving the write-back request. The acknowledgement indicates that the memory has received the data and now corresponds to a new ordering point in the system for the data.

In response to receiving the acknowledgement signal from the memory 16, the processor 12 provides a source broadcast write-back (or victim) message to the other nodes 14 and 20 in the system 10. The broadcast write-back message indicates that the ordering point has moved from the cache 22 to the memory 16. The other nodes 14 and 20 provide responses to the broadcast write-back message from the processor 12. These responses are MISS responses that acknowledge receipt of the broadcast write-back message. When responses have been received from all other nodes in the system 10, the write-back transaction can be terminated (e.g., by releasing an associated transaction).

If one of the other nodes has an outstanding request for the data when such other node receives the broadcast write-back message from the processor 12, the broadcast write-back message forces such other node(s) to recognize a conflict situation. Additionally or alternatively, if the processor 12 receives a broadcast request (e.g., a broadcast read or write) for the data during the write-back transaction, the processor 12 provides a conflict response to the source of the request. When the outstanding request recognizes the existence of a conflict, the requesting processor will reissue the request for the data using a different coherency protocol than the broadcast-based protocol utilized to issue the original broadcast request. For example, the requester can transition to a forward progress cache coherency protocol, such as a null-directory or directory-based protocol.

The system 10 thus can implement a hybrid cache coherency protocol that includes a primary broadcast-based protocol and a secondary directory-based protocol. The secondary protocol can be employed to reissue and process requests in conflict situations that might arise during write-back when an ordering point migrates from cache to memory. Those skilled in the art will appreciate various directory-based cache coherency protocols could be utilized as the secondary protocol by the system 10.

From the foregoing example, it is shown that the ordering point migration to memory is facilitated when the system implements a broadcast-based protocol. That is the system employs a broadcast-based protocol that permits movement of an ordering point from the cache 22 to the memory 16 while the broadcast-based protocol is running. When a conflict situation occurs, requests can be reissued using a generally more robust forward progress protocol to ensure fulfillment of such requests. Additionally, the source-broadcast-based protocol can be implemented without employing tokens to obtain read and write permission.

Figure 2:
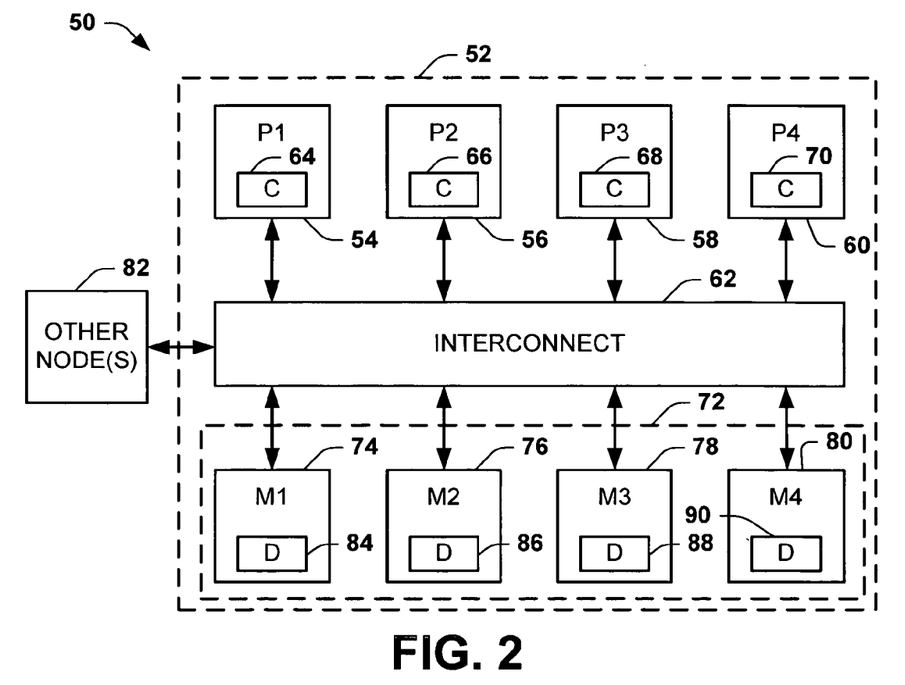
FIG. 2 depicts an example of another multiprocessor system.

FIG. 2 depicts an example of a multiprocessor computing system 50. The system 50, for example, includes an SMP node 52 that includes processors (P1, P2, P3, P4) 54, 56, 58 and 60 in communication with each other via an interconnect 62. The interconnect 62 facilitates transferring data between processors and memory of the system 50. While four processors 54, 56, 58 and 60 are depicted in the example of FIG. 2, those skilled in the art will appreciate that a greater or smaller number of processors can be implemented in the node 52.

Each processor 54, 56, 58 and 60 also includes an associated cache 64, 66, 68 and 70. The caches 64, 66, 68 and 70 can enable faster access to data than from an associated main memory 72 of the node 52. The system 50 implements a cache coherency protocol designed to ensure coherency of data in the system. By way of example, the cache coherency protocol can be implemented to include a source broadcast protocol in which broadcast snoops or requests for data are transmitted directly from a source processor to all other processors and memory in the system 50. The protocol can further be implemented as a hybrid protocol that includes a source broadcast-based protocol in conjunction with another forward progress protocol, such as a null-directory or other directory-based protocol. The system 50 of FIG. 2, for example, employs the source broadcast protocol to broadcast requests for desired data from a source node. If the request cannot succeed when issued using the source broadcast protocol, such as when a conflict exists, the requester reissues the request using the forward progress protocol.

The memory 72 can include multiple memory modules (M1, M2, M3, M4) 74, 76, 78 and 80. For example, the memory 72 can be organized as a single address space that is shared by the processors 54, 56, 58 and 60 as well as other nodes 82 of the system 50. Each of the memory modules 74, 76, 78 and 80 can include a corresponding directory 84, 86, 88 and 90 that defines how the memory blocks are apportioned in each respective module as well as where the corresponding coherent copy of the data should reside in the system 50. Alternatively, the memory modules may contain no directories. A coherent copy of data, for example, may reside in a home node (e.g., associated with a given memory module) or, alternatively, in a cache of one of the processors 54, 56, 58 and 60.

The other node(s) 82 can include one or more other SMP nodes associated with the SMP node 52 via the interconnect 62. For example, the interconnect 62 can be implemented as a switch fabric or hierarchical switch programmed and/or configured to manage transferring requests and responses between the processors 54, 56, 58 and 60 and the memory 70, as well as those to and from the other nodes 82.

When a processor 56 requires updating memory with data, the processor 56 implements a write-back (or victim) transaction. The write-back transaction facilitates migration of an ordering point from cache to memory, such as where the processor's cache 66 contains a copy of the data that may be more up-to-date than the memory. Ordering point migration can occur from cache to memory, for example, when the processor 56 has a state (e.g., M, O or D) associated with the cached data that defines the processor as including a cache ordering point for such data. The write-back transaction also helps ensure data coherency for outstanding requests that might be issued during the write-back transaction.

For example, the processor 56 issues a write-back request to home memory 76, which request includes an up-to-date copy of the data. The processor 56 transitions from its present state (e.g., M, O or D) to the I-state. The memory 76 responds to the write-back request by providing a corresponding acknowledgement message to the processor 56. The acknowledgement message confirms that the memory 76 has been updated with the data and the ordering point has successfully migrated to memory.

In response to the acknowledgement message from the memory 76, the processor 56 broadcasts a victim message to the other nodes 54, 58 and 82 in the system 50. The broadcast victim message alerts the other processors 54 and 58 and the other nodes 82 that an active write-back transaction exists for the data identified (e.g., by address) in the message. The other processors 54 and 58 the other nodes 82 provide corresponding responses back to the processor 56 to acknowledge the broadcast victim message. For example, the processors 54 and 58 and the other nodes 82 can respond with MISS responses. The MISS response corresponds to recognition that the ordering point is being transferred to the memory 76. Accordingly, if one or both of the processors 54 and 58 has an outstanding request for the data identified in the broadcast victim message, a conflict will be recognized. Similarly, if any of the processors 54 and 58 or the other nodes 82 issues a source broadcast request for the data while the write-back transaction still exists at the processor 56, the processor 56 returns a conflict response. The processor 56 can remove the write-back transaction in response to receiving corresponding responses from the processors 54 and 58 as well as the other nodes 82 in the system 50.

When a conflict is detected, such as in response to receiving the broadcast victim message or receiving a conflict response from the processor 56 implementing the write-back transaction, the source processor can reissue the request using a forward progress protocol. The forward progress protocol can be a null-directory protocol or other directory-based protocol. The source processor could also utilize other forward progress techniques, such as by retrying the request in the broadcast-based protocol or a token-based protocol. The retry ensures that the request is processed without deadlock, and a coherent copy of the data is returned to the source.

Figure 3:
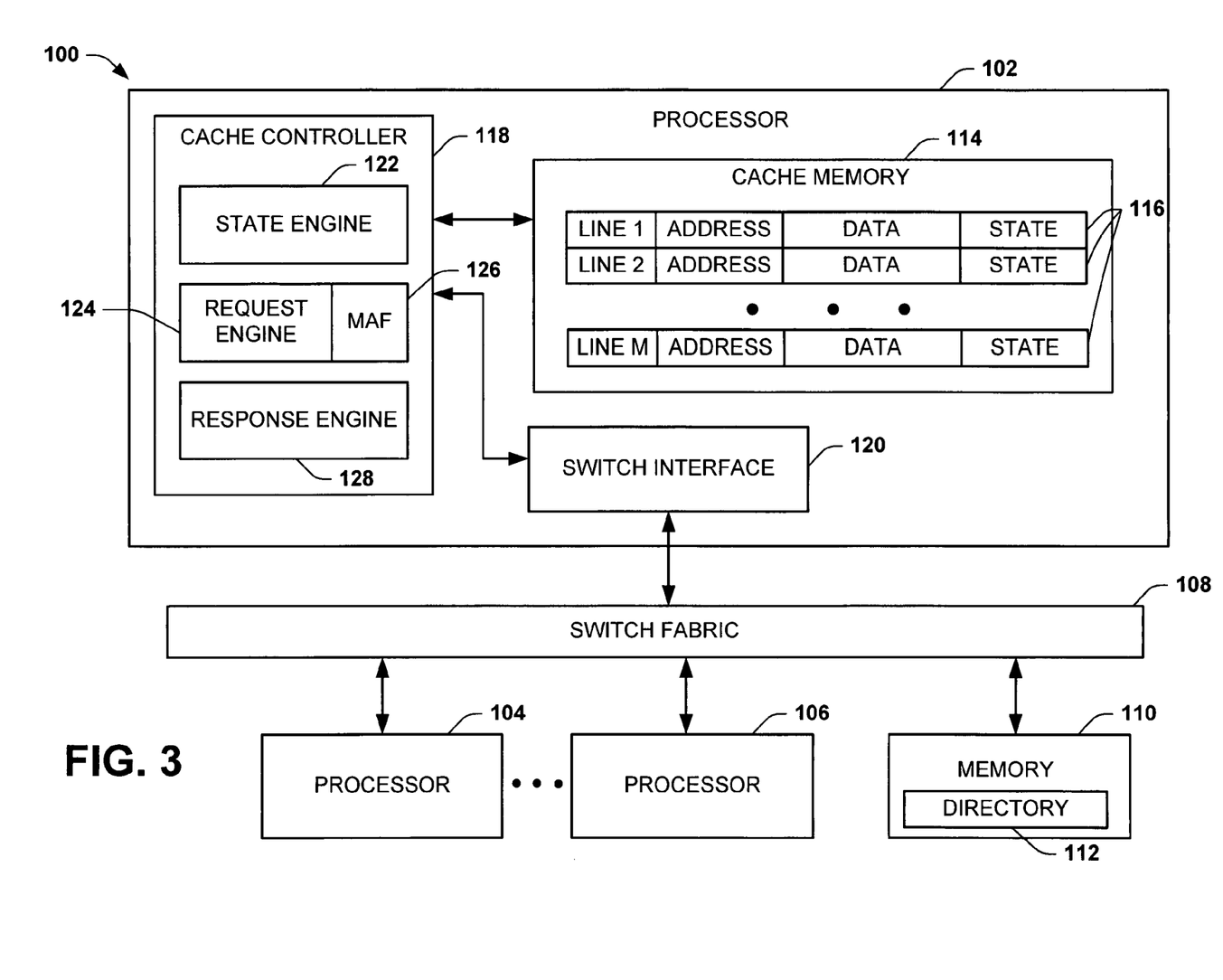
FIG. 3 depicts an example of a processor within a multiprocessor system.

FIG. 3 depicts an example of another multi-processor system 100 that includes a plurality of processors 102, 104 and 106 in communication with each other via a switch fabric 108. The system 100 also includes associated memory 110, which can be organized as a single address space that is shared by the processors 102-106. Alternatively, the memory 110 can be implemented as a plurality of separate memory modules associated with each of the respective processors 102-106 for storing selected data (e.g., as home nodes). The system 100, for example, can be implemented as an integrated circuit or as circuitry (e.g., one or more circuit boards) containing plural integrated circuits.

The system 100 can employ a source broadcast cache coherency protocol. In a source broadcast cache coherency protocol, a source processor 102, 104, 106 can issue a source broadcast request to the system 100, including all other processors in the system and the memory 110. The other processors in the system 100 and the memory 110 respond to the source broadcast request, which can result in a cached copy and/or a memory copy of the data being returned to the source processor. In the event that a conflict arises or the source broadcast request otherwise fails, the source processor reissues the request using a forward-progress protocol.

The forward progress protocol can be a null-directory or a directory-based protocol. For example, the memory 110 includes a home node for each line of data that serves as an ordering point for the data. A source node issues a probe request to the home node for such data. The home node operates as static ordering point for requested data since all requests are sent to the home node for ordering before snoops are broadcast. The forward progress protocol tends to add an additional hop (e.g., increased latency) for the majority of references compared with the broadcast-based protocol, as described above. If the system 100 employs a standard directory-based protocol, ordering is implemented at the home node, but the memory 110 employs an associated directory at the home node to facilitate locating the data (e.g., based on the directory state associated with the requested data). In a standard directory protocol, there will also be circumstances when the directory indicates that there are no cached copies, and thus the home node can respond with the data without issuing any snoops to the system 100.

When a cache hit occurs, a snoop broadcast protocol can be implemented with decreased latency relative to the null-directory protocol or directory-based protocols. Thus, by combining the two protocols as a hybrid protocol, the system 100 can operate in a more robust and efficient manner, achieving the benefits from both protocols.

The processor 102 includes cache memory 114 that contains a plurality of cache lines (e.g., lines 1-M, where M is a positive integer, M>1) 116. Each cache line 116 can contain data that includes one or more memory blocks. An address is associated with the data contained in each cache line 116. Additionally, each cache line 116 contains state information identifying the state of the data contained at that cache line.

Examples of states that can be associated with each cache line 116 are identified above in Table 1.

A cache controller 118 is associated with the cache memory 114. The cache controller 118 controls and manages access to the cache memory, including requests for data and responses to requests from other nodes. The cache controller 118 communicates requests and responses to the system 100 via a switch interface 120 that is coupled with the switch fabric 108. The switch interface 120, for example, includes an arrangement of queues (e.g., input and output queues) or other data structures that organize both requests and responses issued by the processor 102 as well as requests and responses for execution by the processor.

In the example of FIG. 3, the cache controller 118 includes a state engine 122 that controls the state of each respective line 116 in the cache memory 114. The state engine 122 is programmed and/or configured to implement state transitions for the cache lines 116 based on predefined rules established by the cache coherency protocol(s) implemented in the system 100. For example, the state engine 122 can modify the state of a given cache line 116 based on requests issued by the processor 102. Additionally, the state engine 122 can modify the state of a given cache line 116 based on responses, snoops or requests associated with the address of the given cache line. The responses or requests may be provided, for example, by another processor 104, 106 and/or the memory 110.

Examples of state transitions that can occur in the system 100 for selected processor commands are provided in Table 2. The commands beginning with the term "broadcast" generally correspond to broadcast snoop commands implemented within the context of the source broadcast protocol. Most of the other commands (not beginning with "broadcast") are examples of typical commands that can be implemented within the context of the forward progress protocol (e.g., a null directory-based protocol), also implemented by the system 100.

TABLE 2

| Command | Current State | | | Next State | | | |
|---|---|---|---|---|---|---|---|
| | Source | Owner | Sharer | Source | Owner | Sharer | Memory |
| Broadcast non-migratory read request | I | I | I | E or F | I | I | |
| | I | I | S | F | I | S | |
| | I | E | I | S | F | I | |
| | I | F | I | S | F | I | |
| | I | F | S | S | F | S | |
| | I | D | I | S | O | I | |
| | I | M | I | S | O | I | |
| | I | O | I | S | O | I | |
| | I | O | S | S | O | S | |
| Broadcast migratory read request | I | I | I | E | I | I | |
| | I | I | S | F | I | S | |
| | I | E | I | S | F | I | |
| | I | F | I | S | F | I | |
| | I | F | S | S | F | S | |
| | I | D | I | S | O | I | |
| | I | M | I | D | I | I | |
| | I | O | I | S | O | I | |
| | I | O | S | S | O | S | |
| Broadcast incoherent read - read current data | I | I | I | I | I | I | |
| | I | I | S | I | I | S | |
| | I | E | I | I | E | I | |
| | I | F | I | I | F | I | |
| | I | F | S | I | F | S | |
| | I | D | I | I | D | I | |
| | I | M | I | I | M | I | |
| | I | O | I | I | O | I | |
| | I | O | S | I | O | S | |
| Non-migratory | I | I | I | E or S | I | I | |
| | I | I | S | S | I | S | |

TABLE 2-continued

| Command | Current State | | | Next State | | | |
|---|---|---|---|---|---|---|---|
| | Source | Owner | Sharer | Source | Owner | Sharer | Memory |
| read request | I | E | I | S | S | I | |
| | I | F | I | S | S | I | |
| | I | F | S | S | S | S | |
| | I | D | I | S | S | I | Update |
| | I | M | I | S | S | I | Update |
| | I | O | I | S | S | I | Update |
| | I | O | S | S | S | S | Update |
| Migratory read request | I | I | I | E | S | I | |
| | I | I | S | S | S | S | |
| | I | E | I | S | S | I | |
| | I | F | I | S | S | I | |
| | I | F | S | S | S | S | |
| | I | D | I | S | S | I | Update |
| | I | M | I | E | I | I | Update |
| | I | O | I | S | S | I | Update |
| | I | O | S | S | S | S | Update |
| Read-modify with no update to memory | I | I | I | E | I | I | |
| | I | I | S | E | I | I | |
| | I | E | I | E | I | I | |
| | I | F | I | E | I | I | |
| | I | F | S | E | I | I | |
| | I | D | I | D | I | I | |
| | I | M | I | D | I | I | |
| | I | O | I | D | I | I | |
| | I | O | S | D | I | I | |
| Broadcast invalidate line | F | — | I | E | I | I | |
| | F | — | S | E | I | I | |
| | O | — | I | D | I | I | |
| | O | — | S | D | I | I | |
| Read-modify with no update to memory | I | I | I | E | I | I | |
| | I | I | S | E | I | I | |
| | I | E | I | E | I | I | |
| | I | F | I | E | I | I | |
| | I | F | S | E | I | I | |
| | I | D | I | E | I | I | Update |
| | I | M | I | E | I | I | Update |
| | I | O | I | E | I | I | Update |
| | I | O | S | E | I | I | Update |
| Invalidate line | F | — | I | E | I | I | |
| | F | — | S | E | I | I | |
| | O | — | I | D | I | I | |
| | O | — | S | D | I | I | |
| | S | I | I | E | I | I | |
| | S | I | S | E | I | I | |
| | S | F | I | E | I | I | |
| | S | F | S | E | I | I | |
| | S | O | I | E | I | I | Update |
| | S | O | S | E | I | I | Update |
| Invalidate line-no data | I | I | I | E | I | I | |
| | I | I | S | E | I | I | |
| | I | E | I | E | I | I | |
| | I | F | I | E | I | I | |
| | I | F | S | E | I | I | |
| | I | D | I | E | I | I | Update |
| | I | M | I | E | I | I | Update |
| | I | O | I | E | I | I | Update |
| | I | O | S | E | I | I | Update |
| | F | — | I | E | I | I | |
| | F | — | S | E | I | I | |
| | O | — | I | D | I | I | |
| | O | — | S | D | I | I | |
| | S | I | I | E | I | I | |
| | S | I | S | E | I | I | |
| | S | F | I | E | I | I | |
| | S | F | S | E | I | I | |
| | S | O | I | E | I | I | Update |
| | S | O | S | E | I | I | Update |
| Read-modify with update to memory | I | I | I | E | I | I | |
| | I | I | S | E | I | I | |
| | I | E | I | E | I | I | |
| | I | F | I | E | I | I | |
| | I | F | S | E | I | I | |
| | I | D | I | E | I | I | Update |
| | I | M | I | E | I | I | Update |

TABLE 2-continued

| Command | Current State | | | Next State | | | Memory |
|---|---|---|---|---|---|---|---|
| | Source | Owner | Sharer | Source | Owner | Sharer | |
| | I | O | I | E | I | I | Update |
| | I | O | S | E | I | I | Update |
| Cache flush - FPP only | * | * | * | I | I | I | Update |
| Broadcast memory write back | D/M/O | — | I | I | I | I | Update |
| | D/M/O | — | S | I | I | S | Update |
| Memory write back | D/M/O | — | I | I | I | I | Update |
| | D/M/O | — | S | I | I | S | Update |

The cache controller 118 also includes a request engine 124. The request engine 124 employs a miss address file (MAF) 126 that contains MAF entries for outstanding requests associated with a subset of the cache lines 116 of the cache memory 114. The request engine 124 employs the MAF 126 to manage requests issued by the processor 102 as well as responses to such requests. The MAF 126 can be implemented as a table, an array, a linked list or other data structure programmed to manage and track requests for each cache line 116.

For example, when the processor 102 implements a transaction or request associated with a given address line 116, the request engine 124 allocates a corresponding entry for the transaction in the MAF 126. The MAF entry includes fields that identify, for example, the address of the data being requested, the type of request, and response information (e.g., including data and acknowledgements) received from other nodes in response to the request. MAF entries can be utilized to manage requests and other transactions issued using a broadcast-based protocol as well as a directory-based protocol. After the request or transaction is completed, the MAF entry can be retired. A MAF entry is maintained in the MAF 126 for a duration commensurate with the associated request or transaction implemented by the source processor that issues the request or transaction. While, for purposes of illustration, a single MAF 126 is depicted in FIG. 3, plural MAFs might be employed for managing the requests issued under the different protocols employed by the system 100.

The cache controller 118 also includes a response engine 128 that controls responses provided by the processor 102. The processor 102 provides responses to requests or snoops received via the switch interface 120 from another processor 104, 106 or memory 110. The response engine 128, upon receiving a request from the system 100, cooperates with the state engine 122 and the MAF 126 to provide a corresponding response based on the type of request and the state of data contained in the cache memory 114. For example, if a MAF entry exists for an address identified in a source broadcast request provided by another processor, the cache controller 118 can employ the response engine 128 to issue a conflict response back to the processor that issued the broadcast request. A response to a request can also cause the state engine 122 to effect a state transition for an associated cache line 116. Each of the other processor 104-106 can be configured similarly to the processor 102.

By way of further example, assume that the processor 102 requires to update the memory 110 with data stored in a cache line 116 of the cache memory 114, such stored in one of the M, O or D-states. The request engine 118 will create a MAF entry in the MAF 126, corresponding to a write-back (or victim) request. The request engine 124 then transmits the write-back request to the memory 110 via the switch interface 120 and switch fabric 108. The cache controller 118 also employs the state engine 122 to transition the state of the cache line 116 that contains the data to the I-state. The write-back request includes an up-to-data copy of the data. In response to receiving the write-back request, the memory 110 updates the directory 112 and stores the up-to-data copy of the data in a corresponding memory line. The ordering point migration from the cache line 116 to the memory 110 can be considered complete upon updating the directory 112 and writing the data to the memory line. The memory 110 also provides an acknowledgement response to the processor 102.

The processor 102 issues a source broadcast write-back (or victim) message to the other processors 104 and 106 in response to the acknowledgement message from the memory 110. The broadcast write-back message alerts the other processors 104 and 106 that a MAF entry exists in the MAF 126 associated with the write-back request issued by the processor 102. The other processors 104 and 106 provide corresponding responses (e.g., MISS responses) back to the processor 102 to acknowledge the broadcast write-back message. The processor 102 can retire the MAF entry associated with the write-back request in response to receiving corresponding acknowledgement responses from the other processors 104 and 106 in the system 100.

Additionally, if any of the processors 104 and 106 has an outstanding request for the data identified in the broadcast write-back message, a conflict will be recognized by such processor. Similarly, if the processor 102 receives a source broadcast request for the data that is provided by any of the other processors 104 and 106 while the MAF entry still exists in the MAF 126, the processor 102 returns a conflict response to the requesting processor. When a conflict is recognized by a requesting processor 104, 106, the requesting processor can reissue the request using a forward progress protocol, such as a null-directory protocol or other directory-based protocol. The forward progress protocol ensures that the request is processed without deadlock, and a coherent copy of the data is returned to the source. Those skilled in the art will understand and appreciate various forward progress protocols or other forward progress techniques that can be utilized.

In view of the foregoing structural and functional features described above, certain methods that can be implemented using a coherency protocol will be better appreciated with reference FIGS. 4-9. Each of the examples in FIGS. 4-8 illustrates various interrelationships between requests and responses and state transitions that can occur for a given memory address (e.g., memory line) in different memory devices or processor caches associate with migrating an ordering point from a processor's cache to memory. In each of these examples, time flows in the direction of an arrow labeled "TIME." Those skilled in the art may appreciate various other cases that might be implemented using the coherency protocols described herein. The following methodologies can be implemented by hardware (e.g., as one or more integrated circuits or circuit boards containing a plurality of microprocessors), software (e.g., as executable instructions running on one or more processors or controllers), or any combination thereof.

Figure 4:
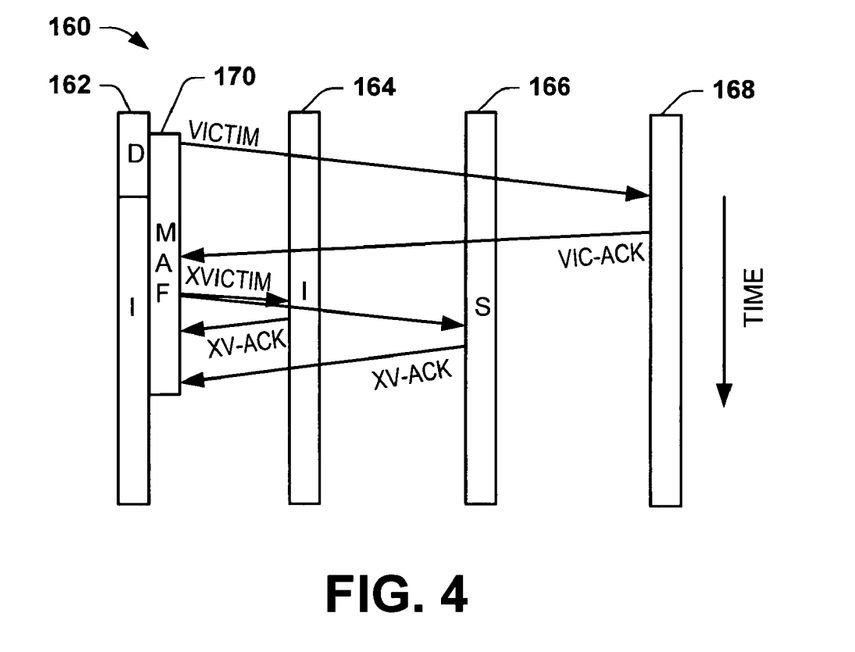
FIG. 4 depicts a first example of an ordering point migration.

FIG. 4 depicts a multi-processor network 160 that includes an owner node 162, target nodes 164-166 and a home node 168. Initially, the requestor node 162 is in the D-state, the node 164 is in the I-state and the node 166 is in the S-state. The node 162 allocates a MAF entry 170 associated with a transaction to write-back the data to the memory associated with the home node 168. The node 162 then issues a victim request to write-back the data to the home node 168. The victim command includes a copy of the data that is being transferred to the memory. The home node 168 responds to the victim command with a victim acknowledgement (VIC-ACK). After issuing the victim command, the node 162 transitions from the D-state to the I-state. While in the example of FIG. 4 the data requestor node 162 is initially in the D-state, alternatively, the requestor node 162 initially could be in the O-state or the M-state for implementing the victim command.

The node 162 issues a broadcast victim (XVICTIM) message or request to the other nodes 164 and 166 in the network 160 while the MAF entry 170 is maintained. Each of the nodes 164, 166 responds with an XVICTIM acknowledgement (XV-ACK) that is provided back to the node 162. After receiving responses to the XVICTIM message from all other nodes 164-166 in the network 160, the node 162 can retire the MAF entry 170. Maintaining the MAF entry 170 until responses have been received from all other nodes helps to ensure that a conflict situation will be recognized to prevent other nodes in the network from receiving non-coherent copies of data. In the foregoing example, the nodes 164 and 166 each remain in the respective I and S-states.

Figure 5:
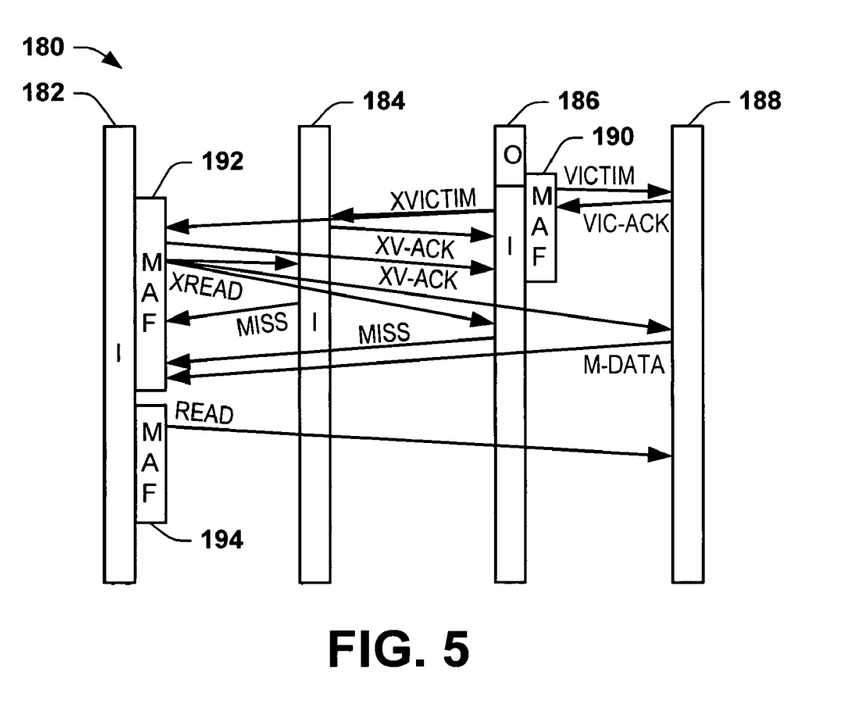
FIG. 5 depicts a second example of an ordering point migration.

FIG. 5 illustrates an example of a conflict situation that can occur in a multiprocessor network 180. The network 180 includes nodes 182 and 184 initially in the I-state and a node 186 that is initially in the O-state. The node 186 requires to write-back (or victimize) data stored in a cache line of such node to a home node or memory 188. In order to implement a transaction for writing back the data to the home node 188, the node 186 allocates a MAF entry 190. The node 186 then issues a VICTIM request for transferring the up-to-date data to the home node 188. In response to receiving the VICTIM request and associated data, the home node 188 provides a VIC-ACK response to the node 186 indicating that the ordering point has migrated from the cache of the node 186 to the home node 188. As a subsequent part of the write-back transaction associated with the MAF entry 190, the node 186 broadcasts an XVICTIM message to the other nodes 182 and 184. The node 184 responds with an XV-ACK signal acknowledging receipt of the XVICTIM message. Prior to receiving the XVICTIM message from the node 186, however, the node 182 allocates a MAF entry 192 associated with a broadcast read (XREAD) request that is issued using a source broadcast protocol implemented in the network 180. The node 182 broadcasts the XREAD request to the nodes 184, 186 and 188. In response to receiving the XV-ACK responses from the other nodes, the requestor node 186 retires its MAF entry 190 and remains in the I-state.

Since each of the nodes 184 and 186 is in the I-state when the XREAD request is received from the node 182, the nodes 184 and 186 respond by providing non-data MISS responses. As described herein, the MISS response indicates that the node does not contain a valid copy of the data being requested. The home node 188 responds to the XREAD request with a memory copy of data (M-data). After receiving the responses from all the nodes in the network, the node 182 reissues the request for the desired data using an associated forward progress protocol. The node 182 reissues the request using the forward progress protocol because the XVICTIM message broadcast by the node 186 is received at the node 182 during the existence of the MAF entry 192. That is, the XVICTIM message forces nodes having an outstanding request for the data to recognize a conflict situation. Thus, the node 182 allocates a MAF entry 194 using the forward progress protocol (e.g., directory-based protocol) and issues a READ request to the home node 188. The forward progress protocol implemented by the network 180 is designed to ensure requests for data succeed with fill data.

Figure 6:
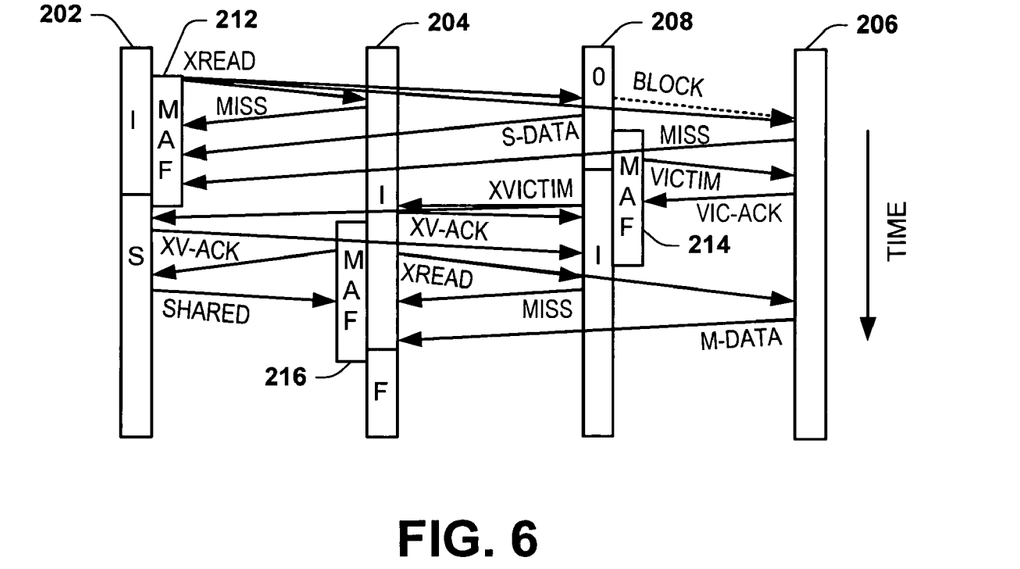
FIG. 6 depicts a third example of an ordering point migration.

FIG. 6 depicts an example of another multiprocessor network 200 that includes a source node 202, a target node 204 and a home node 206. The network 200 also includes a node 208 that has an owner state (O-state) associated with the data that defines the node as a cache ordering point for the data stored in its cache. In this example, the source node 202 allocates a MAF entry 212 and issues a source broadcast XREAD request to the other nodes 204, 206 and 208 in the network 200. The node 204, being in the I-state, provides a MISS response. The node 208, being in the O-state provides a shared data response (S-data) that includes a copy of the requested data and remains in the O-state. The home node 206, for example, responds to the XREAD request with a MISS since a BLOCK signal is received at the home node prior to the XREAD request. The node 208 can provide the BLOCK signal to prevent the home node from providing a data response, as usually required by the protocol, provided that the BLOCK signal arrives at or before the XREAD request. Alternatively, for example, the home node 206 could respond to the XREAD request with a memory copy of the data in a situation when no block signal is provided by the node 208 or when the bock signal arrives after the XREAD request. The source node 202 transitions from the I-state to the S-state in response to receiving the responses to the XREAD request. The node 202 also retires its MAF entry 212.

In this example, the node 208 allocates a MAF entry 214 to implement a write-back transaction to the home node 206. Thus, the node 208 issues a VICTIM request to the home node 206 that includes a copy of the data being write back to memory. The home node 206 responds to the VICTIM request with a VIC-ACK response. The VIC-ACK response causes the node 208 to broadcast XVICTIM messages to the other nodes 202 and 204 in the network 200. Each of the nodes 202 and 204 responds with an XV-ACK signal acknowledging receipt of the XVICTIM message from the node 208. Upon receiving the XV-ACK responses from all other nodes in the network 200, the node 208 retires the MAF entry 214.

Subsequent to receiving the XVICTIM message from the node 208, the node 204 allocates a MAF entry 216 associated with requesting a copy of the data. Thus, the node 204 issues an XREAD request to the other nodes 202, 206 and 208 in the network 200. Since the node 202 is in the S-state, the node 202 provides a non-data shared response, indicating that the node contains a shared copy of the requested data. The node 208 provides a MISS response since the node 208 is in the I-state at the time the node 208 receives the XREAD request from the node 204. The home node 206 provides a data response (M-data) that includes a memory copy of the requested data. The node 204 transitions from the I-state to the F-state in response to receiving the responses identified above, and removes the MAF entry for such data. The node 204 can then respond with shared copies of the data for subsequent requests for the data because the data is contained in the node 204 in the F-state. (See, e.g., Table 1).

Figure 7:
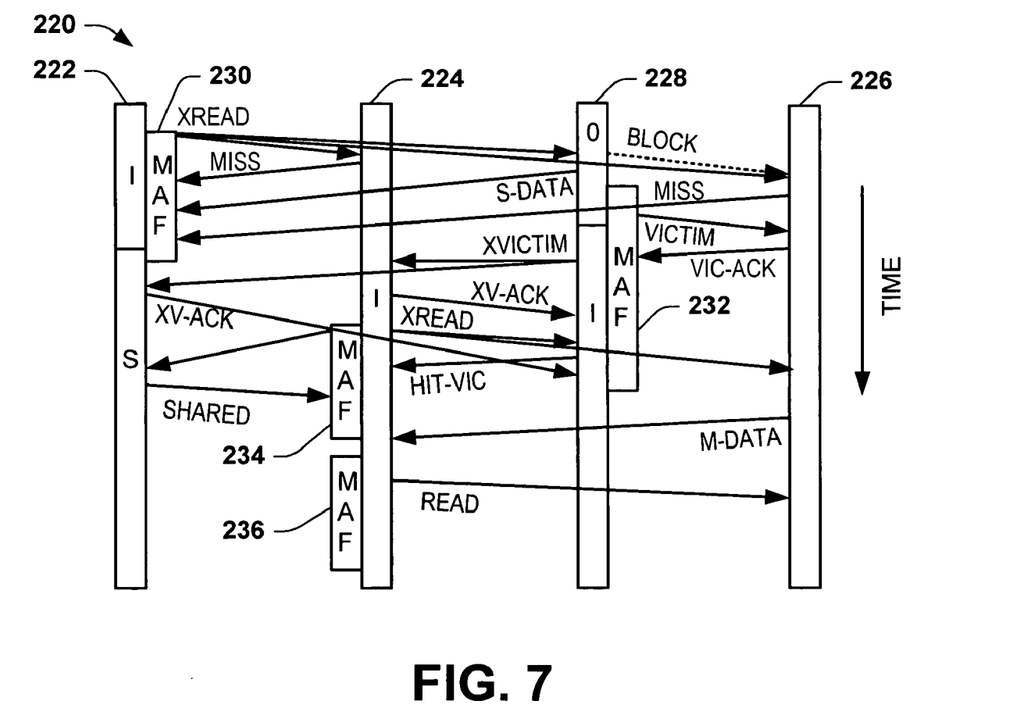
FIG. 7 depicts a fourth example of an ordering point migration.

FIG. 7 depicts yet another example of a network 220 that includes nodes 222 and 224 as well as a home node 226. The network also includes a node 228 that has a state (O-state) associated with the data, which state defines the node as a cache ordering point for the data stored in its cache. The source node 222 allocates a MAF entry 230 and issues a source broadcast XREAD request to the other nodes 224, 226 and 228 in the network 220. The node 224 provides a MISS response and the node 228 provides a shared data response (S-data) that includes a copy of the requested data. The node 228 can remains in the O-state. The home node 226 responds to the XREAD request with a MISS since a BLOCK signal is received at the home node prior to the XREAD request. Alternatively, for example, the home node 226 could respond to the XREAD request with a memory copy of the data. The source node 222 transitions from the I-state to the S-state in response to receiving the responses to the XREAD request. The node 22 also retires its MAF entry 212 and remains in the S-state for the associated data.

In this example, the node 228 allocates a MAF entry 232 to implement a write-back transaction to the home node 226. Thus, the node 228 issues a VICTIM request to the home node 226 that includes a copy of the data being write back to memory. The home node 206 responds to the VICTIM request with a VIC-ACK message, indicating that the ordering point has migrated from the cache of the node 228 to the home node 226. The node 228 also provides a source broadcast XVICTIM message to the other nodes 222 and 224 in the network 220 in response to the VI-ACK message. Each of the nodes 222 and 224 responds with an XV-ACK signal acknowledging receipt of the XVICTIM message that was broadcast from the node 228. Upon receiving the XV-ACK responses from all other nodes in the network 220, the node 228 retires the MAF entry 214.

Subsequent to receiving the XVICTIM message from the node 228, the node 224 allocates a MAF entry 234 for requesting a copy of the data. The node 224 issues a source broadcast XREAD request to the other nodes 222, 226 and 228. The node 224 alternatively could issue other types of source broadcast requests. Since the node 222 is in the S-state, the node 202 provides a non-data SHARED response, indicating that the node contains a shared copy of the requested data. The home node 206 provides a data response (M-data) that includes a memory copy of the requested data. Since the MAF entry 232 still exists at the node 228 when the XREAD request is received from the node 224, the node 228 responds to the XREAD request by issuing a HIT-VIC response. The HIT-VIC response indicates that the XREAD request corresponds to data that is being victimized by the node 228 associated with an existing MAF entry 232. The HIT-VIC response forces the node 224 to recognize a conflict for the outstanding MAF entry 234. As a result, the node 224 can retire the MAF entry 234, which was issued using a source-broadcast protocol, and allocate a new MAF entry 236 using an associated forward progress protocol (e.g., a directory-based protocol). The node 224 then reissues the request for the data as a READ request to the home node 226 using the forward progress protocol.

In view of the above, those skilled in the art will understand and appreciate that the coherency protocols described herein enables and facilitates migration of ordering points from the cache of one processor to memory. The movement of the ordering point from cache to memory facilitates accessing and modifying data while a broadcast-based cache coherency protocol continues to run. As a result, the approach described herein can afford reduced latency for a cache hit using the broadcast-based protocol. Additionally, a hybrid protocol can be employed to enable non-fillable broadcast requests to be reissued (e.g., in conflict situations) using an associated forward progress protocol, such as a directory-based protocol.

Figure 8:
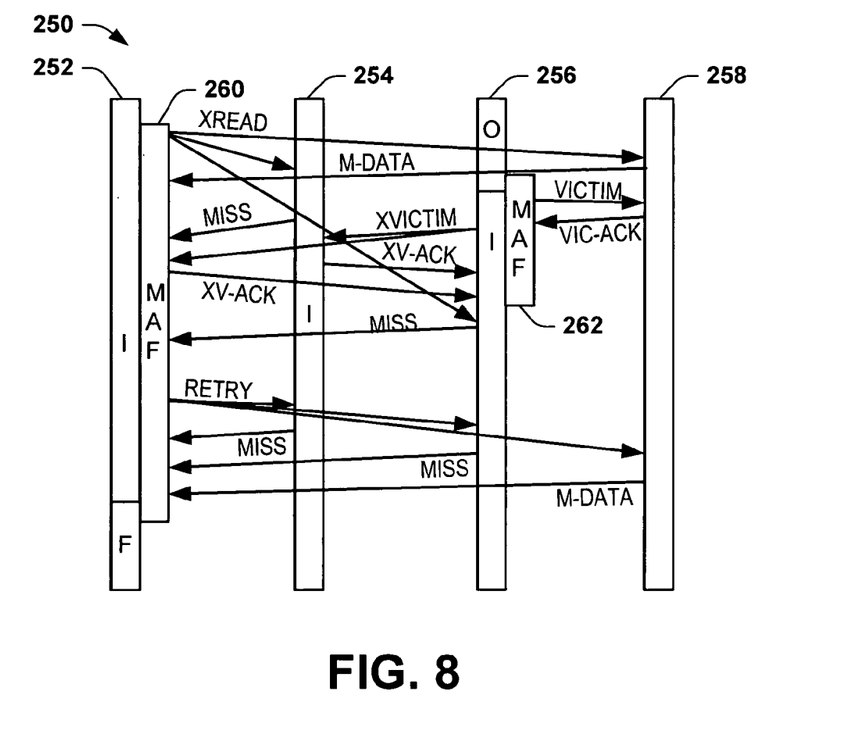
FIG. 8 depicts a fifth example of an ordering point migration.

FIG. 8 illustrates another example of a conflict situation that can occur in a multiprocessor network 250. The network 250 includes nodes 252 and 254 initially in the I-state. Another node 256 is initially in the O-state, which state defines the node as an ordering point for the line of data represented in FIG. 8. The node 252, requiring a copy of the data, allocates a MAF entry 260 and issues an XREAD request (e.g., a migratory read request) using a source broadcast protocol implemented in the network 250. The node 260 broadcasts the XREAD request to the nodes 254, 256 and 258. Since the nodes 254 and 256 are both in the I-state when such nodes receive the XREAD request, the nodes 254 and 256 respond by providing non-data MISS responses. The home node 188 responds to the XREAD request with a memory copy of data (M-data).

The node 256 requires to write-back (or victimize) data stored in a cache line of such node to the home node 258. The node 256 allocates a MAF entry 262 and issues a VICTIM command (e.g., a write-back transaction) for transferring the cached data to the home node 258. In the example of FIG. 8, the write-back transaction occurs concurrently with the XREAD transaction at the node 252. Since the home node receives the XREAD request prior to the VICTIM command, the home node provided an M-data response to the XREAD request that might include stale data. Subsequent to providing the M-data response, the home node 258 receives the VICTIM command and provides a corresponding VIC-ACK response, thereby indicating that the ordering point has migrated from the cache of the node 256 to the home node 258. The node 256 broadcasts an XVICTIM message to the other nodes 252 and 254. The nodes 252 and 254 respond with respective XV-ACK signals acknowledging receipt of the XVICTIM message.

Since the node 252 has a MAF outstanding when the XVICTIM message is received, the XVICTIM message from the node 256 sets a conflict condition at the node 252. Accordingly, after receiving the responses from all the nodes in the network and the conflict condition has been set, the node 252 retries the request for the desired data. In the absence of the XVICTIM message, the node 252 would utilize the potentially stale M-data response from the home node. In the example of FIG. 8, the retry is depicted as a source broadcast request to the network 250. The nodes 254 and 256, both being in the I-state, provide corresponding MISS responses, and the home node provides an M-data response. This M-data response corresponds to a coherent copy of the requested data due to the memory update previously implemented by the VICTIM command. As a result, the node 252 can transition from the I-state to the F-state and retire the MAF entry 260 in response to the M-data response. It is to be appreciated that other forward progress techniques could be employed to retry and complete the XREAD request (e.g., using an associated forward progress protocol).

Figure 9:
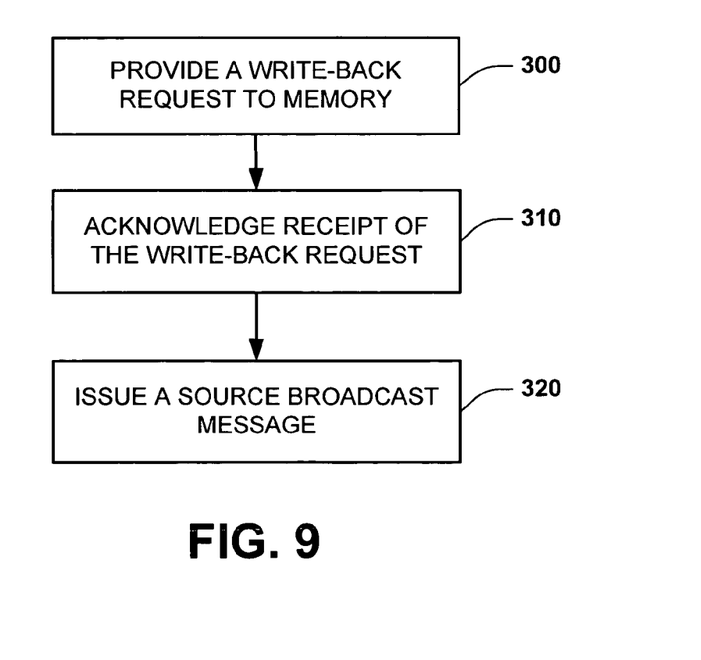
FIG. 9 depicts a flow diagram illustrating a method.

FIG. 9 depicts a method that includes providing a write-back request from a first processor node to transfer an ordering point associated with data to memory, as shown at 300. The method also includes acknowledging receipt of the write back request at the memory, as shown at 310. The method further includes issuing a source broadcast message from the first processor node to other nodes in response to acknowledging receipt of the write back request at the memory, as shown at 320.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system comprising:
   a first node that includes an ordering point for data, the first node being operative to employ a write-back transaction associated with writing the data back to memory, the first node broadcasting a write-back message to at least one other node in the system in response to an acknowledgement provided by the memory indicating that the ordering point for the data has migrated from the first node to the memory, wherein the first node comprises a processor having an associated cache that comprises a plurality of cache lines, one of the plurality of cache lines having an associated state that defines the cache line as a cache ordering point for the data prior to employing the write-back transaction.

2. The system of claim 1, wherein the first node further comprises a request engine having an associated miss address file, the request engine allocating an entry in the miss address file associated with the write-back transaction for the data that is maintained in the miss address file until responses have been received from all other nodes in the system to the write-back message broadcast by the first node.

3. A system comprising:
a first node that includes an ordering point for data, the first node being operative to employ a write-back transaction associated with writing the data back to memory, the first node broadcasting a write-back message to at least two other nodes in the system in response to an acknowledgement provided by the memory indicating that the ordering point for the data has migrated from the first node to the memory, wherein each of the at least two other nodes provides a response to the first node acknowledging receipt of the write-back message broadcast by the first node.

4. The system of claim 3, wherein the first node maintains the write-back transaction active until the first node receives responses from the at least two other nodes to the write-back message broadcast by the first node.

5. The system of claim 4, further comprising a third node that issues a source broadcast request for the data employing a source broadcast protocol, the third node retrying the source broadcast request for the data in response to recognizing a conflict associated with the source broadcast request for the data.

6. The system of claim 5, wherein the conflict is recognized by the third node in response to one of (i) receiving the write-back message broadcast by the first node while the source-broadcast request for the data is active at the third node, or (ii) receiving a conflict response from the first node to the source broadcast request issued by the third node.

7. The system of claim 5, wherein the third node retries the source broadcast request employing a forward progress protocol.

8. A computer system, comprising:
a first processor that provides a write-back request to transfer an ordering point for desired data from associated cache of the first processor to memory;
the memory providing an acknowledgement back to the first processor in response to the write-back request, the first processor providing a source broadcast write-back request to the system in response to the acknowledgement provided by the memory;
at least one other processor in the system that provides an acknowledgement response to the first processor in response to the source broadcast write-back request provided by the first processor; and
an entry in a miss address file at the first processor that is associated with transferring the ordering point from the associated cache of the first processor to the memory the entry in the miss address file being maintained until responses to the source broadcast write-back request have been received from all other processors in the system.

9. The system of claim 8, wherein the system employs a source broadcast protocol, the system further comprising a third node that issues a source broadcast request for the desired data, the third node reissuing the source broadcast request in response to recognizing a conflict associated with the source broadcast request for the desired data.

10. The system of claim 9, wherein the conflict is recognized by the third node in response to one of (i) receiving the source broadcast write-back request provided by the first node while the source-broadcast request for the desired data is active at the third node, or (ii) receiving a conflict response from the first node to the source broadcast request issued by the third node.

11. The system of claim 9, wherein the third node reissues the source broadcast request employing a forward progress protocol implemented in the system.

12. The system of claim 8, wherein the first processor comprises a cache line that contains the desired data in a state that defines the cache line as the ordering point for the desired data prior to issuing the write-back request to the memory.

13. The system of claim 12, wherein the state that defines the cache line as the ordering point for the desired data is selected from a group consisting of a modified state, an owner state and a dirty state, the cache line transitioning to an invalid state after issuing the write-back request to the memory.

14. A multiprocessor computer system, comprising:
means for issuing a write-back request to migrate an ordering point for data from an associated cache to memory;
means for providing a source broadcast write-back message associated with the data to the system in response to the memory acknowledging receipt of the write-back request;
means at each of at least one node in the system for acknowledging receipt of the source broadcast write-back message; and
means for retiring an outstanding transaction associated with migration of the ordering point to the memory from the associated cache in response to receiving acknowledgement of receipt of the source broadcast write-back message.

15. The system of claim 14, further comprising means for recognizing a conflict associated with the data.

16. The system of claim 14, wherein the means for issuing the write-back request comprises a first processor including a cache line that contains the data in a state that defines the cache line as the ordering point for the data prior to migration of the ordering point to the memory.

17. The system of claim 16, wherein the state that defines the cache line as the ordering point for the data is selected from a group consisting of a modified state, an owner state and a dirty state, the cache line transitioning to an invalid state after issuing the write-back request to the memory.

18. The system of claim 14, further comprising means for transitioning a cache line in the associated cache to an invalid cache state for the data after the write-back request is issued.

19. A method comprising:
providing a write-back request from a first processor node to transfer an ordering point associated with data to memory;
acknowledging receipt of the write back request at the memory; and
issuing a source broadcast message from the first processor node to other nodes in response to the acknowledging receipt of the write back request at the memory;

wherein the first processor comprises a cache line that contains the data in a state that defines the cache line as the ordering point for the data prior to issuing the write-back request to the memory.

20. The method of claim 19, further comprising recognizing a conflict associated with a request for the data provided by at least one of the other nodes.

21. The method of claim 20, wherein the request for the data provided by the at least one of the other nodes comprises a source broadcast request, the recognizing of the conflict further comprising recognizing the conflict in response to one of (i) receiving the write-back request provided by the first processor node while the source broadcast request for the data is outstanding at the at least one of the other nodes, or (ii) receiving a conflict response from the first node to a source broadcast request issued by the at least one of the other nodes.

22. The method of claim 19, further comprising transitioning the state of the data in the first processor from a first state to an invalid state after issuing the write-back request to the memory, the first state being selected from a group consisting of a modified state, an owner state and a dirty state.

23. A method comprising:
providing a write-back request from a first processor node to transfer an ordering point associated with data to memory;
acknowledging receipt of the write back request at the memory;
issuing a source broadcast message from the first processor node to other nodes in response to the acknowledging receipt of the write back request at the memory; and
providing a response from each of the other nodes to acknowledge receipt of the source broadcast message at the other nodes.

24. The method of claim 23, further comprising maintaining a write-back transaction at the first processor node until the first processor node receives the responses to the source broadcast message from the other nodes.

25. The method of claim 24, further comprising retiring the write-back transaction at the first processor node in response to receiving the responses from each of the other nodes acknowledging receipt of the source broadcast message.

* * * * *

UNITED STATES PATENT AND TRADEMARK OFFICE
CERTIFICATE OF CORRECTION

PATENT NO. : 7,769,959 B2 Page 1 of 1
APPLICATION NO. : 10/760599
DATED : August 3, 2010
INVENTOR(S) : Stephen R. Van Doren et al.

It is certified that error appears in the above-identified patent and that said Letters Patent is hereby corrected as shown below:

In column 17, line 66, in Claim 8, delete "memory" and insert -- memory, --, therefor.

Signed and Sealed this

Thirtieth Day of November, 2010

David J. Kappos
*Director of the United States Patent and Trademark Office*